(12) United States Patent
Fugel et al.

(10) Patent No.: US 8,348,515 B2
(45) Date of Patent: Jan. 8, 2013

(54) AXIAL BEARING WITH AN AXIAL ANGLE DISK WITH A SECURING TAB PRODUCING A SECURED MOUNTING AND CARRIER WITH SUCH AN AXIAL BEARING

(75) Inventors: Wolfgang Fugel, Nuremberg (DE); Alexander Reimchen, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 525 days.

(21) Appl. No.: 12/416,199

(22) Filed: Apr. 1, 2009

(65) Prior Publication Data
US 2009/0252449 A1 Oct. 8, 2009

(30) Foreign Application Priority Data
Apr. 2, 2008 (DE) .......................... 10 2008 016 880

(51) Int. Cl.
*F16C 33/58* (2006.01)
*F16C 19/30* (2006.01)
(52) U.S. Cl. ....................................... 384/620; 384/622
(58) Field of Classification Search .................. 384/620, 384/622
See application file for complete search history.

(56) References Cited

U.S. PATENT DOCUMENTS

| 4,783,183 A | * | 11/1988 | Gardella | ....................... 384/620 |
| 5,110,223 A | | 5/1992 | Koch et al. | |
| 5,967,674 A | | 10/1999 | Reubelt et al. | |

FOREIGN PATENT DOCUMENTS

| AT | 215222 | | 5/1961 |
| DE | 68904188 | | 12/1992 |
| DE | 69121948 | | 9/1996 |
| DE | 19716195 | | 10/1998 |
| DE | 69510512 | | 6/1999 |
| DE | 10227377 | | 1/2004 |
| DE | 19857033 | | 1/2008 |
| EP | 0513697 | | 5/1992 |
| FR | 2155065 | | 5/1973 |
| JP | 2003-247624 | * | 9/2003 |
| JP | 2006071076 | | 3/2006 |

* cited by examiner

*Primary Examiner* — William C Joyce
(74) *Attorney, Agent, or Firm* — Volpe and Koenig, P.C.

(57) ABSTRACT

An axial bearing having an axial angle disk and a cage with rolling bodies. The rolling bodies are supported so that they can roll on a rolling surface of a radial section of the axial angle disk, and the axial angle disk has a securing tab projecting outward in a radial direction and within a plane. The securing tab extends in a radial direction past a nominal diameter of the axial angle disk, and the securing tab is used for a secured mounting and extends in the radial direction past a nominal diameter by less than the sheet thickness (d) of the axial angle disk.

15 Claims, 6 Drawing Sheets

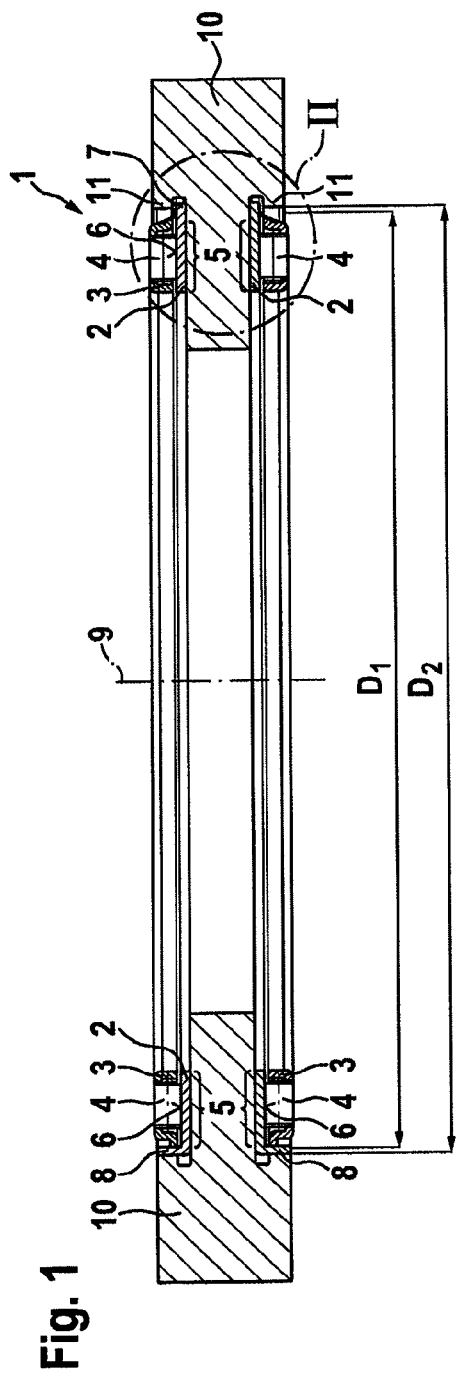
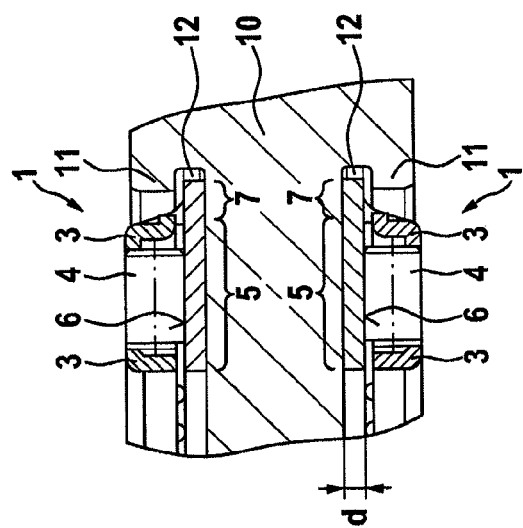
Fig. 1
Fig. 2

AXIAL BEARING WITH AN AXIAL ANGLE DISK WITH A SECURING TAB PRODUCING A SECURED MOUNTING AND CARRIER WITH SUCH AN AXIAL BEARING

CROSS-REFERENCE TO RELATED APPLICATIONS

This application claims the benefit of DE 10 2008 016 880.7, filed Apr. 2, 2008, which is incorporated herein by reference as if fully set forth.

FIELD OF THE INVENTION

The invention relates to an axial bearing with an axial angle disk and a cage with rolling bodies, wherein the rolling bodies are supported so that they can roll on a rolling surface of a radial section of the radial angle disk, wherein, furthermore, the axial angle disk has a securing tab projecting outward in the radial direction and within a plane, wherein the securing tab extends in the radial direction past a nominal diameter of the axial angle disk. The invention also relates to a carrier with such an axial bearing.

BACKGROUND OF THE INVENTION

The nominal diameter is defined as the outer diameter in the projection-free portion of the axial angle disk, wherein this outer diameter corresponds to the bearing seat diameter under consideration of bearing borehole tolerances.

Bearing borehole tolerances are understood to be the gap between an inner wall of a borehole (D2) in which the axial bearing is inserted and the outer diameter (D1) of the axial angle disk free from projections in the radial direction, that is, the outer diameter of the axial angle disk in the region in which the securing tab is not present. The bearing borehole tolerances here also comprise production tolerances with respect to the outer diameter of the axial angle disk in the region in which the securing tab is not present and in the region of the bearing borehole itself. Here it is not decisive whether the bearing seat is formed in the shape of a borehole or is, for example, primary molded.

From the state of the art, for example, from DE 10227377 A1, DE 19716195 A1, U.S. Pat. No. 5,110,223, DE 69121948 D2, DE 69510512 D2, DE 68904188 C2, and DE 14416320 A1, different axial bearings are known.

From DE 10227377 A1, for example, an axial bearing is known that has an axial angle disk. The axial angle disk has inner and outer axial angled sections. These angled sections come into contact with a carrier that is also designated in the state of the art as a housing. The axial angle disk of DE 10227377 A1 comes into a positive-fit connection with the carrier via projections that are inserted into the axial angled sections.

While the formation of projections on the inner, axial angled section is disclosed from DE 10227377 A1, it is also already known from the state of the art to provide projections on the outer, axial angled section. Each projection is then formed with a "harpoon nose-like" shape. In this way, a section of the axial angled section forming a projection is shaped without cutting. This projection is then used as a securing tab. The securing tab comes into contact with a recessed region of the housing.

From DE 19716195 A1, another axial angle disk of an axial bearing is known. Here, the axial angle disk also has a securing tab that that is not completely bent at a right angle, that is, does not have axial projections on its edges. The securing tab is used for allowing torsional locking by engaging in a recess of a housing.

The solutions from the known art feature various disadvantages. For example, a harpoon nose-like securing solution according to DE 10227377 A1 requires a sufficiently large axial dimension for a borehole in the carrier holding the axial bearing. The depth of the carrier then needed is not available in various applications. In such a case, the axial bearing would project out of the carrier and thus come into contact with other added-on parts, which would lead to defects in the scope of the interaction between the different components. Reducing the axial dimensions of the projection formed on the axial angled section and/or the axial angled section itself would lead to the projection of the axial angle disk designated as the tab breaking away from the carrier.

A securing tab, as known from DE 19716195 A1, is further used not for secured mounting, but instead merely for torsional locking and also has large spatial requirements.

SUMMARY

Starting from the mentioned disadvantages of the solutions of the known state of the art, the invention is therefore based on the objective of making available an axial bearing that produces only small spatial requirements in a carrier, especially with respect to the axial expansion, does not deform plastically during construction, and is economical and also fail-safe. An object of the invention is also to make available a carrier with such an axial bearing.

According to the invention, an axial bearing is provided in which the securing tab used for secured mounting extends in the radial direction past the nominal diameter by less than the sheet thickness of the axial angle disk.

Through such a configuration according to the invention, the axial bearing can be inserted into a bearing borehole so that the securing tab deforms merely in its elastic range and is held in the bearing borehole due to the restoring force. Even for overhead mounting, such an axial bearing does not fall out of the carrier. Additional mounting costs are avoided. Also, a securing tab dimensioned in this way springs elastically, also independent of the material selection, back into its original form before its introduction, without leaving permanent deformation due to the insertion.

Additionally, a carrier with such an axial bearing is provided, wherein the carrier has a recess that is formed by an undercut and in which the securing tab engages.

Such a carrier can be produced economically and provides the securing tab with the ability to come into a positive-fit connection with the carrier, by which falling out is effectively prevented even for the case of overhead mounting. Here, the mounting and production costs are also reduced. In addition, the failure percentage of installed machine components is reduced.

Advantageous embodiments are explained below in more detail.

Thus, it is especially advantageous if the securing tab extends in the radial direction by less than the bearing borehole tolerances plus 0.75 times the axial angle disk thickness. Through such dimensioning of the securing tab, it is guaranteed that only a small projection exists outside of the remaining periphery of the axial angle disk and is deformable only in an elastic range, through which the ability to mount the axial bearing in a pre-machined bearing borehole remains guaranteed. The mounting is therefore easier to perform.

If the securing tab extends in the radial direction by less than the bearing borehole tolerances plus 0.05 mm, advantageously 0.02 mm, more advantageously 0.01 mm, then the manageability of the axial bearing increases even more, especially when it is mounted.

In another embodiment it is advantageous when the axial angle disk has a rim projecting from the radial section, wherein this rim is broken in the region of the securing tab. Such a rim prevents radial displacement of the axial bearing and therefore increases the precision of the same. The service life of the installed axial bearing is further increased.

If the securing tab extends in the radial direction past the extent of the rim, then in such an advantageous embodiment, clamping of the axial bearing in the bearing borehole or in a groove formed in the base of the bearing borehole is simplified.

Unnecessary stress occurring when it is mounted is prevented if, in a transition region from the rim to the securing tab, there is an advantageously rounded recess extending in the radial direction.

To prevent the axial bearing from tipping out of the bearing borehole in overhead mounting, it is especially effective when, in another advantageous embodiment, a securing tab is formed in at least three regions advantageously arranged equidistant to each other.

An especially advantageous construction of an axial bearing is then provided if the surface of the securing tab located in a plane with the rolling surface comes into contact with a region of the carrier forming the undercut. Through the use of the regions of the carrier located in contact with each other and the securing tab, a defined flow of forces can be achieved. This flow of forces must only be so large that a secured mounting is guaranteed.

If the recesses in the axial direction have a greater extent than the securing tab, advantageously more than the sheet thickness of the axial angle disk, then the fitting of the axial bearing into the bearing borehole when it is mounted would be particularly simplified.

The undercut can be realized particularly economically, easily, and effectively if the undercut is produced without cutting, advantageously mortised, or is formed in the shape of a groove with cutting, advantageously turning or milling. A non-cutting production of the undercut, for example, by mortising, is also possible at a later time if the axial bearing is inserted into the bearing borehole and therefore can be used, if needed, in such applications in which overhead mounting is applied. The costs are reduced considerably.

BRIEF DESCRIPTION OF THE DRAWINGS

The invention will be explained in greater detail below with reference to the accompanying drawings. Shown are:

FIG. 1 is a schematic section view through a carrier with two axial bearings according to the invention, FIG. 2 is a detail diagram in a schematic section view of the two axial bearings according to the invention in the carrier from FIG. 1 in an enlarged diagram.

DETAILED DESCRIPTION OF THE PREFERRED EMBODIMENTS

Figure 3:
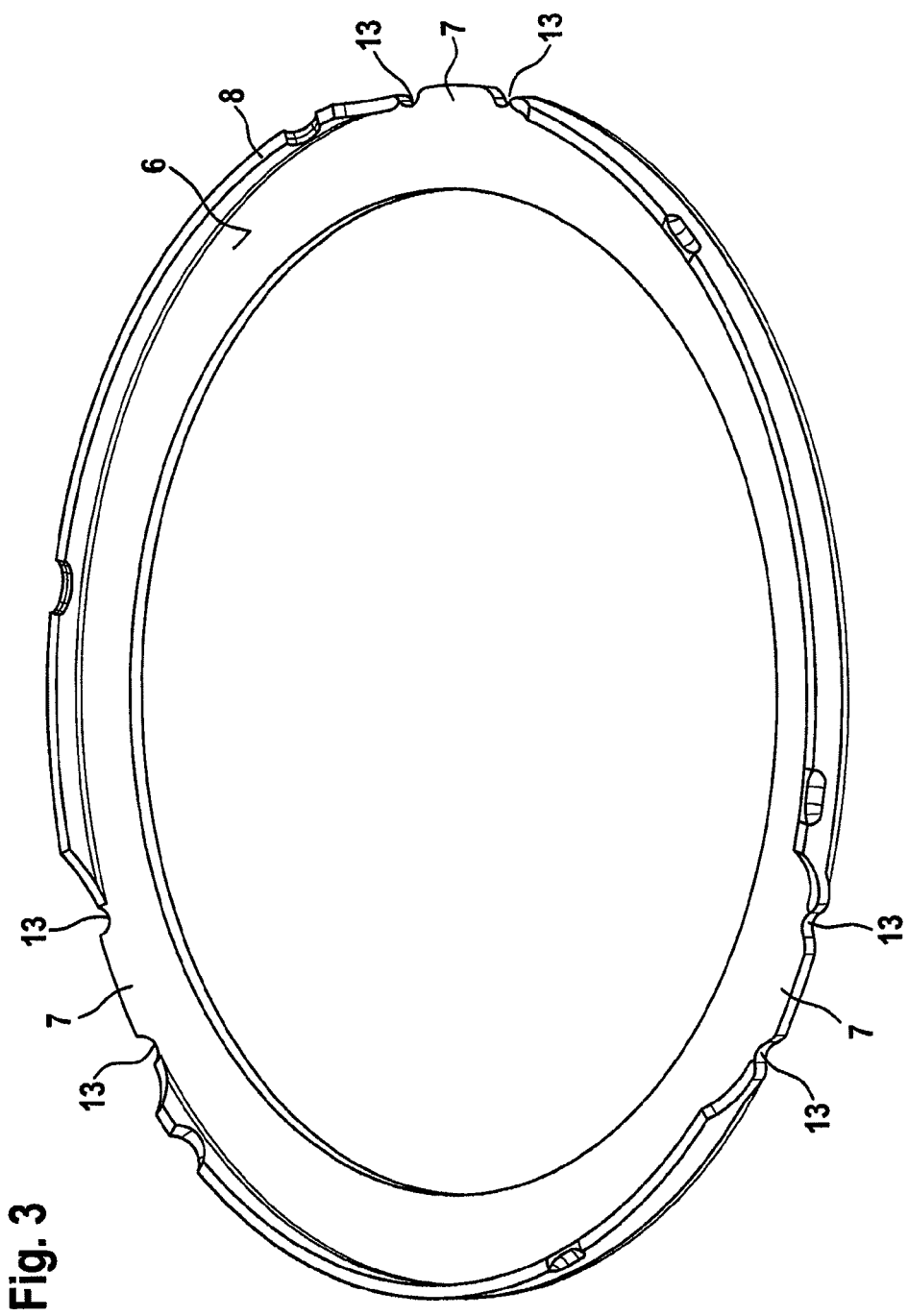
FIG. 3 is a schematic diagram in a perspective view of an isolated axial angle disk, one of the axial bearings shown in FIG. 2.

In FIGS. 1 to 9, the same reference symbols are used for the same elements.

FIG. 1 shows an axial bearing 1 with an axial angle disk 2 and a cage 3 in which rolling bodies 4 are arranged. The axial angle disk 2 has a radial section 5. The radial section 5 has a rolling surface 6 facing the rolling bodies 4. The axial bearing 1 further has securing tabs 7 that project outward in the radial direction past the remaining periphery of the axial angle disk 2. In FIG. 1 only one securing tab per axial angle disk 2 is shown. Each of the two shown axial bearings 1 has three securing tabs 7 on each of the corresponding axial angle disks 2. This can be seen, among other things, in FIGS. 3 and 5.

The axial angle disk 2 has a rim 8 that projects in the axial direction on the outer radial edge of the axial angle disk 2. The axial direction is fixed by a rotational axis 9 of the axial bearing 1. The rim 8 is broken in the region of the securing tab 7, so that the radial section extends integrally into the securing tab 7 and forms this tab. The rolling surface 6 then transitions without a break into the corresponding surface of the securing tab 7.

In a carrier 10 that is also designated as a housing, there are two axial bearings 1. The lower axial bearing 1 is here mounted in an overhead position. The carrier 10 here has a projection 11 that is arranged so that it forms an undercut viewed relative from a surface of the securing tab 7 directed perpendicular to the axial direction, wherein the securing tab 7 of the axial bearing 1 engages behind the undercut in the state installed in the carrier 10. The projection 11 here forms a recess, in particular, a groove 12 in the carrier 10.

The sheet thickness of the axial angle disk 2 is designated with d. The outer diameter of the rim 8 is designated with D1. The borehole diameter in the carrier 10 is designated with D2. The securing tab 7 bridges the gap between D1 and D2 and also extends outward in the radial direction by the magnitude of the sheet thickness d of the axial angle disk 2. The securing tab 7 here also extends outward sufficiently far that bearing borehole tolerances are bridged.

The axial extent of the groove 12 is here greater than the sheet thickness d of the axial angle disk 2. The radial extent of the groove 12 is also greater than the greatest radial extent of the axial angle disk 2, so that the axial angle disk 2 also does not contact an axial surface of the carrier 10 with the radial end of the securing tab 7. In the installed state, there is spacing between the radial end face of the securing tab 7 and the carrier 10. Undesired clamping of the axial angle disk 2 and thus the axial bearing 1 in the bearing borehole is thus prevented, so that there is no mounting stress and no frictional corrosion when operating.

In FIG. 3 the rolling surface of the axial angle disk 2 can be seen that is closed nearly continuously with a rim on the radial, peripheral edge. The rim 8 is broken only at the positions of the securing tabs 7. In the transition region between the rim 8 and the securing tabs 7 there are recesses 13. These recesses 13 are rounded. The three securing tabs 7 are arranged equidistant to each other and point symmetric to the center of the axial angle disk 2. The rim 8 is formed, with a radius, orthogonal to the rolling surface 6. Notch stresses are avoided because the recesses 13 are rounded on both sides of the securing tabs 7.

Figure 4:
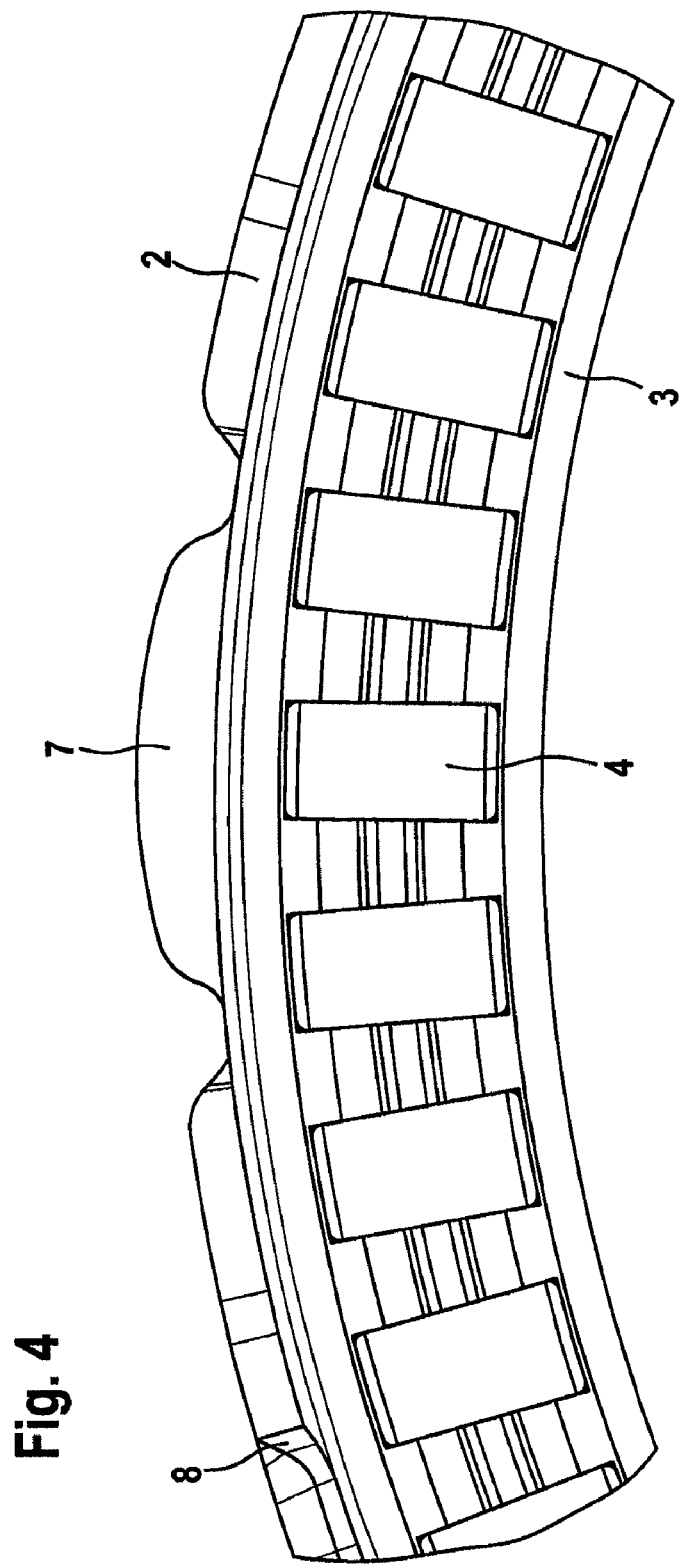
FIG. 4 is a perspective sub-view in schematic construction of the axial bearing from FIG. 3 with a securing tab shown in greater detail.

In FIG. 4, a perspective section view of the axial angle disk 2 is shown with the roller body-guiding cage 3, and also a securing tab 7. The securing tab 7 is also rounded, so that only the central part of the securing tab 7 has the maximum radial extent.

Figure 5:
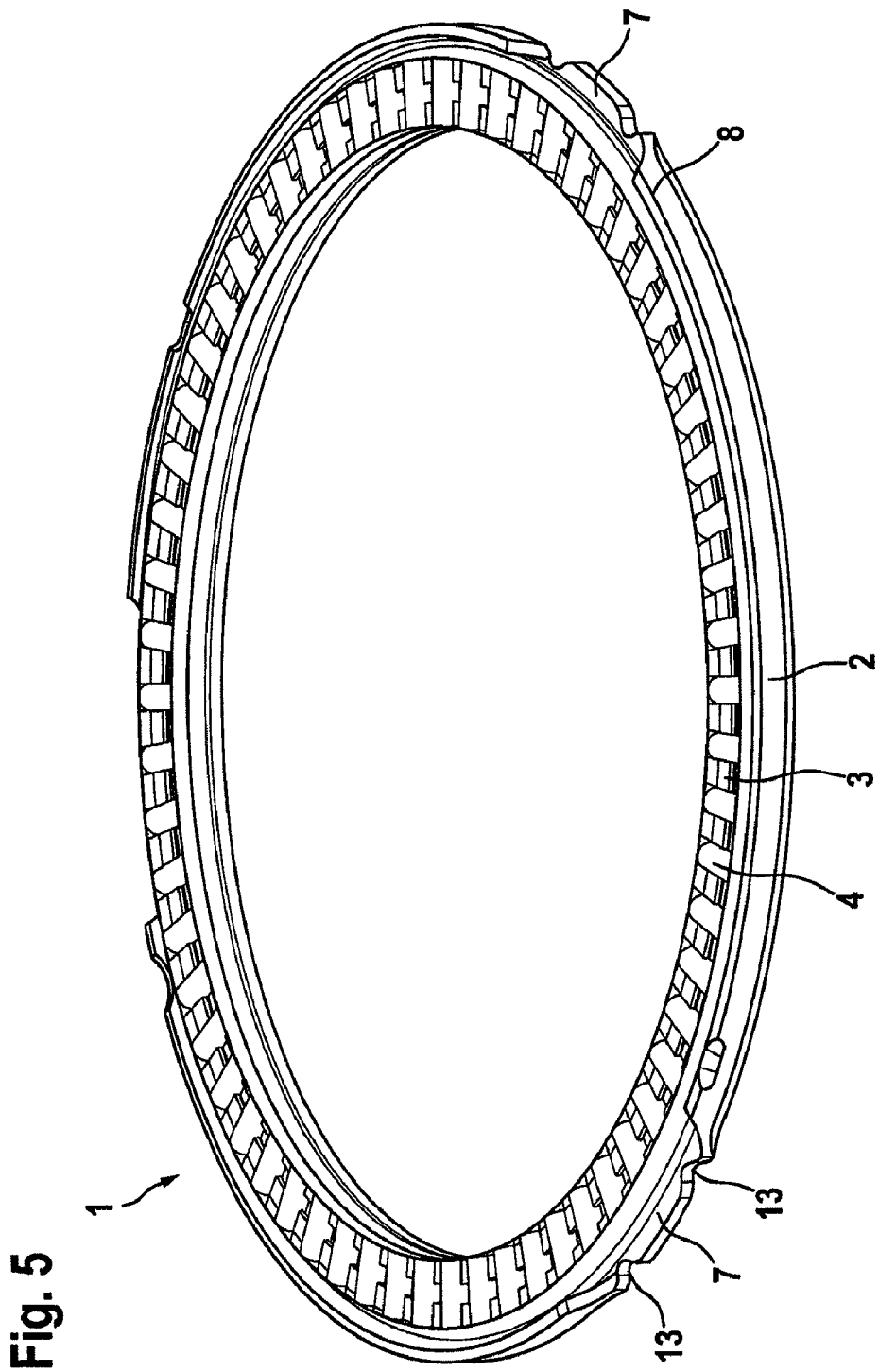
FIG. 5 is a perspective view of an axial bearing, as it is shown in FIGS. 1 to 3.
Figure 6:
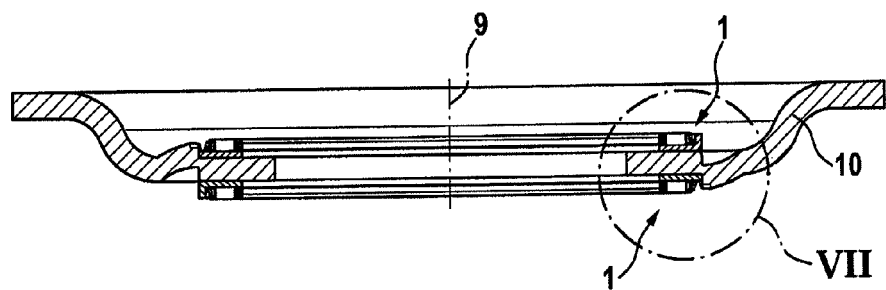
FIG. 6 is a schematic section view of a carrier with two axial bearings according to the invention in a second embodiment in a cross-sectional diagram.
Figure 7:
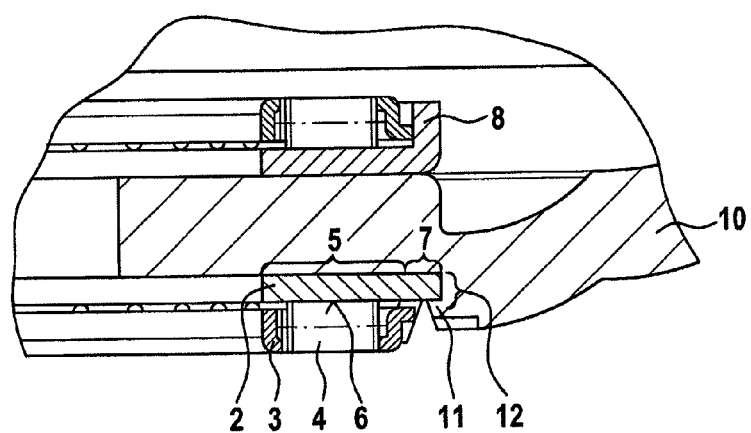
FIG. 7 is an enlarged diagram of the two axial bearings in the region of the contact with the carrier from FIG. 6.

In FIG. 5 the axial bearing 1 is shown in the preassembled state, that is, not yet installed in the carrier 10. Here, two of the three securing tabs 7 are shown. It is possible to use more than three securing tabs 7, e.g., 4, 6, or more securing tabs.

A second embodiment of a carrier 10 is shown in FIGS. 6 to 9. Here, in FIGS. 6 and 7, the installation of two axial bearings 1 is shown. The recess in the carrier 10, wherein this recess can also be formed as a groove 12, is achieved by stamping the projections 11 in the carrier 10. The projection 11 further forms the undercut on which the securing tab 7 is supported and prevents the axial angle disk 2 and thus the axial bearing 1 from falling out from the carrier 10.

Figure 8:
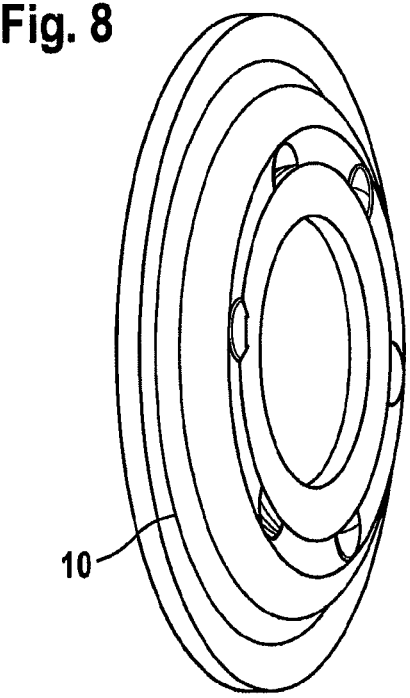
FIG. 8 is a perspective diagram of the carrier from FIGS. 6 and 7 without axial bearings according to the invention.
Figure 9:
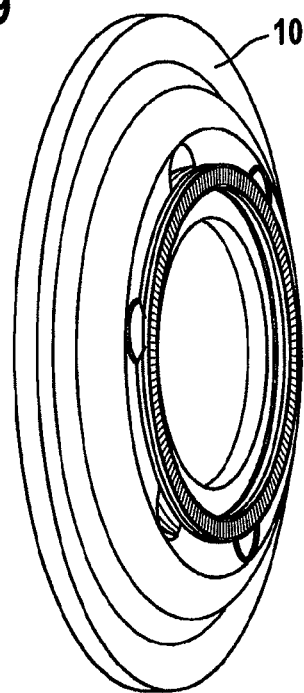
FIG. 9 is a perspective view of the carrier from FIGS. 6 to 8 with installed axial bearings.

In FIGS. 8 and 9, the carrier 10 is shown in perspective. In FIG. 8, the carrier 10 is shown without the two axial bearings 1 and in FIG. 9 with two installed axial bearings 1.

LIST OF REFERENCE SYMBOLS

1 Axial bearing
2 Axial angle disk
3 Cage
4 Rolling body
5 Radial section
6 Rolling surface
7 Securing tabs
8 Rim
9 Rotational axis
10 Carrier
11 Projection
12 Groove
13 Recesses
d Sheet thickness
D1 Outer diameter of 8
D2 Borehole diameter in 10

The invention claimed is:

1. An axial bearing comprising an axial angle disk and a cage with rolling bodies, the rolling bodies are supported so that they can roll on a rolling surface of a radial section of the axial angle disk, the axial angle disk has a securing tab projecting outward in a radial direction in a plane of the rolling surface, wherein the securing tab extends in a radial direction past a nominal diameter of the axial angle disk, the nominal diameter being defined as an outer diameter of the axial angle disk in a region away from the securing tab, the securing tab used for secured mounting extends in the radial direction past the nominal diameter by less than the sheet thickness (d) of the axial angle disk.

2. The axial bearing according to claim 1 in combination with a carrier having a borehole, wherein the securing tab extends in the radial direction by less than a bearing borehole tolerance, defined as a gap between an inner wall of the borehole and an outer diameter of the axial angle disk in a region away from the securing tab, plus 0.75 times a sheet thickness (d) of the axial angle disk, with the securing tab being elastically deflected for engagement in the borehole of the carrier.

3. The axial bearing according to claim 2, wherein the carrier has a recess in which the securing tab engages, and the recess is formed by an undercut.

4. The axial bearing according to claim 3, wherein a surface of the securing tab located in the plane with the rolling surface comes into contact with a region of the carrier forming the undercut.

5. The axial bearing according to claim 3, wherein the recess has, in the axial direction, a larger extent than the securing tab.

6. The axial bearing according to claim 3, wherein that the undercut is produced without cutting or is formed as a groove through machining.

7. The axial bearing according to claim 3, wherein the recess has, in the axial direction, a larger extent than the securing tab, that is more than the sheet thickness (d).

8. The axial bearing according to claim 1 in combination with a carrier having a borehole, wherein the securing tab extends in the radial direction by less than a bearing borehole tolerance, defined as a gap between an inner wall of the borehole and an outer diameter of the axial angle disk in a region away from the securing tab, plus 0.05 mm, with the securing tab being elastically deflected for engagement in the borehole of the carrier.

9. The axial bearing according to claim 1, wherein the axial angle disk has a rim that projects axially from the radial section and that is broken in a region of the securing tab.

10. The axial bearing according to claim 9, wherein the securing tab extends in the radial direction past a radial extent of the rim.

11. The axial bearing according to claim 9, a recess that has a rounded shape and that extends in the radial direction is provided in a transition region from the rim to the securing tab.

12. The axial bearing according to claim 1, wherein the securing tabs are formed in at least three regions that are separate from each other and that are arranged equidistant to each other.

13. The axial bearing according to claim 1 in combination with a carrier having a borehole, wherein the securing tab extends in the radial direction by less than a bearing borehole tolerance, defined as a gap between an inner wall of the borehole and an outer diameter of the axial angle disk in a region away from the securing tab, plus 0.5 times a sheet thickness (d) of the axial angle disk, with the securing tab being elastically deflected for engagement in the borehole of the carrier.

14. The axial bearing according to claim 1 in combination with a carrier having a borehole, wherein the securing tab extends in the radial direction by less than a bearing borehole tolerance, defined as a gap between an inner wall of the borehole and an outer diameter of the axial angle disk in a region away from the securing tab, plus 0.02 mm, with the securing tab being elastically deflected for engagement in the borehole of the carrier.

15. The axial bearing according to claim 1 in combination with a carrier having a borehole, wherein the securing tab extends in the radial direction by less than a bearing borehole tolerance, defined as a gap between an inner wall of the borehole and an outer diameter of the axial angle disk in a region away from the securing tab, plus 0.01 mm, with the securing tab being elastically deflected for engagement in the borehole of the carrier.

* * * * *